United States Patent [19]
Widman

[11] Patent Number: 5,439,196
[45] Date of Patent: Aug. 8, 1995

[54] SAFETY CHRISTMAS TREE STAND

[76] Inventor: Vincent L. Widman, 10063 E. Township Rd. 138, Clyde, Ohio 43410

[21] Appl. No.: 164,530

[22] Filed: Dec. 10, 1993

[51] Int. Cl.$^6$ .............................................. F16M 13/00
[52] U.S. Cl. .......................................... 248/524; 47/43
[58] Field of Search ......................... 248/523, 519, 524; 47/47 S, 47 L, 43 R

[56] References Cited

U.S. PATENT DOCUMENTS

| | | | |
|---|---|---|---|
| 2,671,624 | 3/1954 | Carney | 248/524 |
| 4,399,973 | 8/1983 | Spry et al. | 248/524 |
| 4,889,309 | 12/1989 | McCure | 248/524 |
| 5,161,768 | 11/1992 | Sarabin | 248/188.7 X |

FOREIGN PATENT DOCUMENTS 2629176  9/1989  France ............................. 248/523

Primary Examiner—Ramon O. Ramirez

[57] ABSTRACT

A new and improved tree stand for securing a cut tree in an upright position, the tree stand comprising a container adapted to receive the butt of a tree trunk and hold it in an upright position, a clamp adapted to hold a tree trunk, and a mechanism for locating the clamp at a position offset from and aligned with the container where it holds a tree trunk upright.

2 Claims, 4 Drawing Sheets

SAFETY CHRISTMAS TREE STAND

BACKGROUND OF THE INVENTION

1. Field of the Invention

The present invention relates to a Christmas tree stand and more particularly pertains to a Christmas tree stand for holding a Christmas tree in an upright position.

2. Description of the Prior Art

The use of tree stands is known in the prior art. More specifically, tree stands heretofore devised and utilized for the purpose of holding a tree in an upright position are known to consist basically of familiar, expected and obvious structural configurations, notwithstanding the myriad of designs encompassed by the crowded prior art which have been developed for the fulfillment of countless objectives and requirements. By way of example, U.S. Pat. Nos. 4,796,382 to Anderson; 4,989,820 to Sterling; 5,074,514 to Smith; 5,086,583 to Breen; and 5,090,655 to Bisson all disclose stands for holding and supporting trees.

While these devices fulfill their respective, particular objective and requirements, the aforementioned patents do not describe a Christmas tree stand that holds a Christmas tree upright at the butt end and along the trunk at a position offset from the butt end.

In this respect, the Christmas tree stand according to the present invention substantially departs from the conventional concepts and designs of the prior art, and in doing so provides an apparatus primarily developed for the purpose of holding a Christmas tree in an upright position.

Therefore, it can be appreciated that there exists a continuing need for new and improved Christmas tree stand which can be used for holding a Christmas tree in an upright position. In this regard, the present invention substantially fulfills this need.

SUMMARY OF THE INVENTION

In the view of the foregoing disadvantages inherent in the known types of tree stands now present in the prior art, the present invention provides an improved Christmas tree stand. As such, the general purpose of the present invention, which will be described subsequently in greater detail, is to provide a new and improved Christmas tree stand and method which has all the advantages of the prior art and none of the disadvantages.

To attain this, the present invention essentially comprises a container having a bottom end and an opening opposite the bottom end, the container adapted to receive a butt end of a tree trunk through the opening and hold a reservoir of water, the container further having a plurality of knife blades disposed therein and coupled thereto, the knife blades aligned to engage a tree trunk and hold it in an upright position. A rigid and planar base has the bottom end of the container centrally affixed thereto, the base adapted to stabilize the container when the butt end of a tree trunk is disposed therein. Also provided is a clamp further comprising an elongated support arm having a tip end and a base end and a U-shaped member coupled to the tip end, the U-shaped member adapted to hold a tree trunk therein. An elongated and rigid first staging rod has a first end a second end, the first end coupled to the base end of the clamp, an elongated and rigid second staging rod further comprising a lower end, an upper end, and an intermediate location defined therebetween, and a lower segment and an upper segment, the lower segment extending laterally between the lower end and the intermediate location, the upper segment extending upwardly from the intermediate location to the upper end. A first collar is coupled to the upper end of the second staging rod with the first staging rod slidably disposed therein, the first collar further having a threaded hole disposed thereon with a screw disposed therein for securing the first staging rod thereto once the lateral extent of the first staging rod relative to the first collar has been adjusted. A second collar has a downwardly extending alignment rod coupled thereto and the lower segment of the second staging rod slidably disposed therein, the collar further having a threaded hole disposed thereon with a screw disposed therein for securing the second staging rod thereto once the lateral extent of the second staging rod relative to the second collar has been adjusted. Also provided is an elongated and upright support leg further comprising a rigid tubular pole connected to the base and a plurality of gussets coupled to the pole and the base for reinforcing the connection therebetween, the pole having a first end and a second end, the first end connected to the base with the second end extending upwardly therefrom, the second end having the alignment rod of the second collar rotatably disposed therein, the second end of the pole further having a threaded hole disposed thereon with a screw disposed therein for securing the second collar thereto once the upward extent of the alignment rod and the angular displacement of the second staging rod relative to the container has been adjusted, whereby the base, support leg, second collar, second staging rod, first collar, and first staging rod combine to locate the clamp at a position offset from and aligned with the container where it holds a tree trunk upright.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved Christmas tree stand which has all the advantages of the prior art tree stands and none of the disadvantages.

It is another object of the present invention to provide a new and improved Christmas tree stand which may be easily and efficiently manufactured and marketed.

It is a further object of the present invention to provide a new and improved Christmas tree stand which is of durable and reliable construction.

An even further object of the present invention is to provide a new and improved Christmas tree stand which is susceptible of a low cost of manufacture with regard to both materials and labor, and which accordingly is then susceptible of low prices of sale to the consuming public, thereby making such a Christmas tree stand economically available to the buying public.

Still yet another object of the present invention is to provide a new and improved Christmas tree stand which provides in the apparatuses and methods of the prior art some of the advantages thereof, while simultaneously overcoming some of the disadvantages normally associated therewith.

Even still another object of the present invention is to provide a new and improved Christmas tree stand for holding a Christmas tree in an upright position.

Even still another object of the present invention is to provide a new and improved Christmas tree stand for holding a Christmas tree that makes it virtually impossible to topple the tree, minimizing the danger of physical injury or material damage, such as fire due to breaking electrical Christmas bulbs.

Even still another object of the present invention is to provide a new and improved Christmas tree stand designed to firmly support a Christmas tree without the need to repeatedly adjust its attitude or reposition it when it has been inadvertently nudged.

Even still another object of the present invention is to provide a new and improved Christmas tree stand that has a container which serves as the lower mooring point for a tree and is filled with water to keep the tree fresh.

Even still another object of the present invention is to provide a new and improved Christmas tree stand having an adjustable clamp engaged around the tree that may be adjusted to suit the shape and fullness of the tree. This clamp serves as an upper mooring point for the tree that takes full advantage of the leverage principle by creating a large vertical span between the lower and upper mooring points to make tipping the tree virtually impossible, either intentionally or by accident.

Lastly, it is an object of the present invention is to provide a new improved Christmas tree stand for securing a cut tree in an upright position, the tree stand comprising a container adapted to receive the butt of a tree trunk and hold it in an upright position, a clamp adapted to hold a tree trunk, and means for locating the clamp at a position offset from and aligned with the container where it holds a tree trunk upright.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
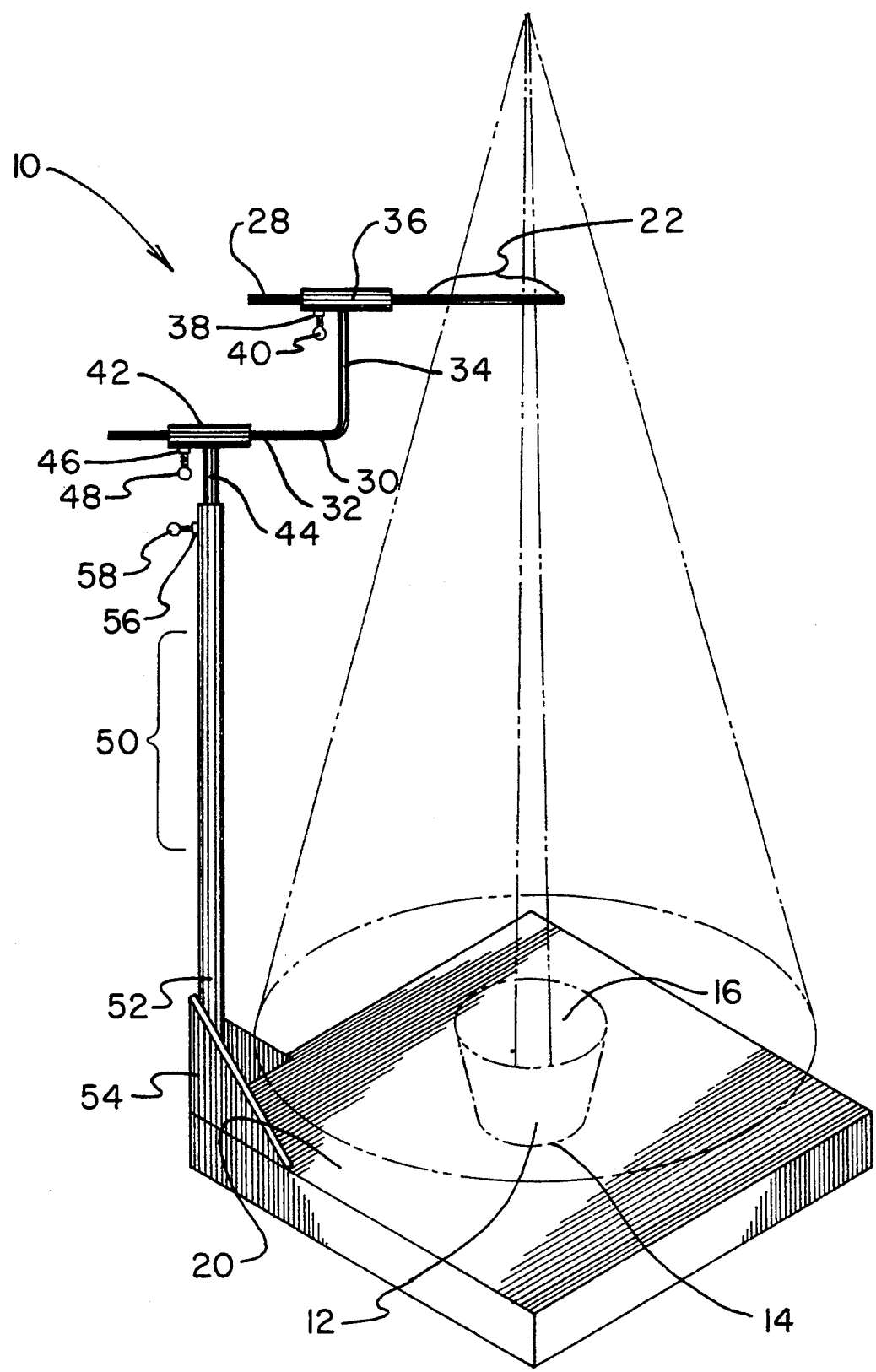
FIG. 1 is a perspective view of the preferred embodiment of the Christmas tree stand constructed in accordance with the principles of the present invention.
Figure 2:
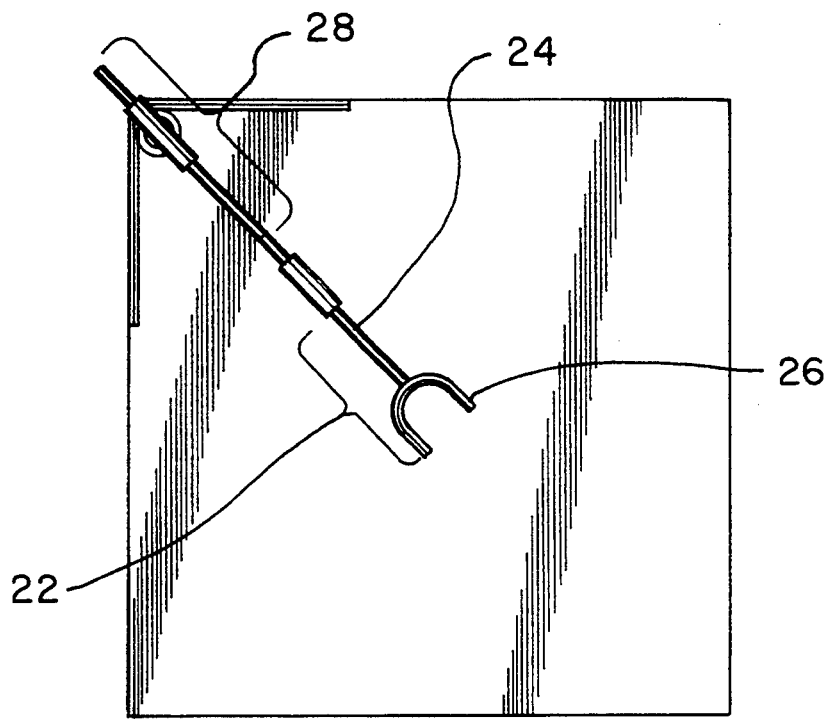
FIG. 2 is a plan view of the Christmas tree stand shown in FIG. 1.
Figure 3:
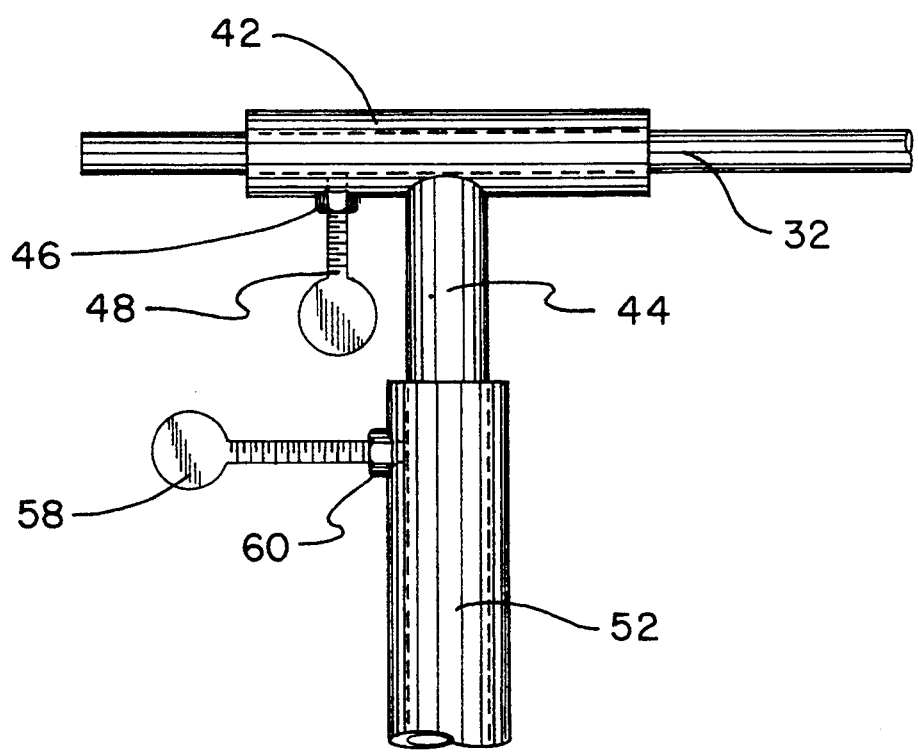
FIG. 3 is an enlarged view of the connection between the second collar and the pole of the Christmas tree stand.
Figure 4:
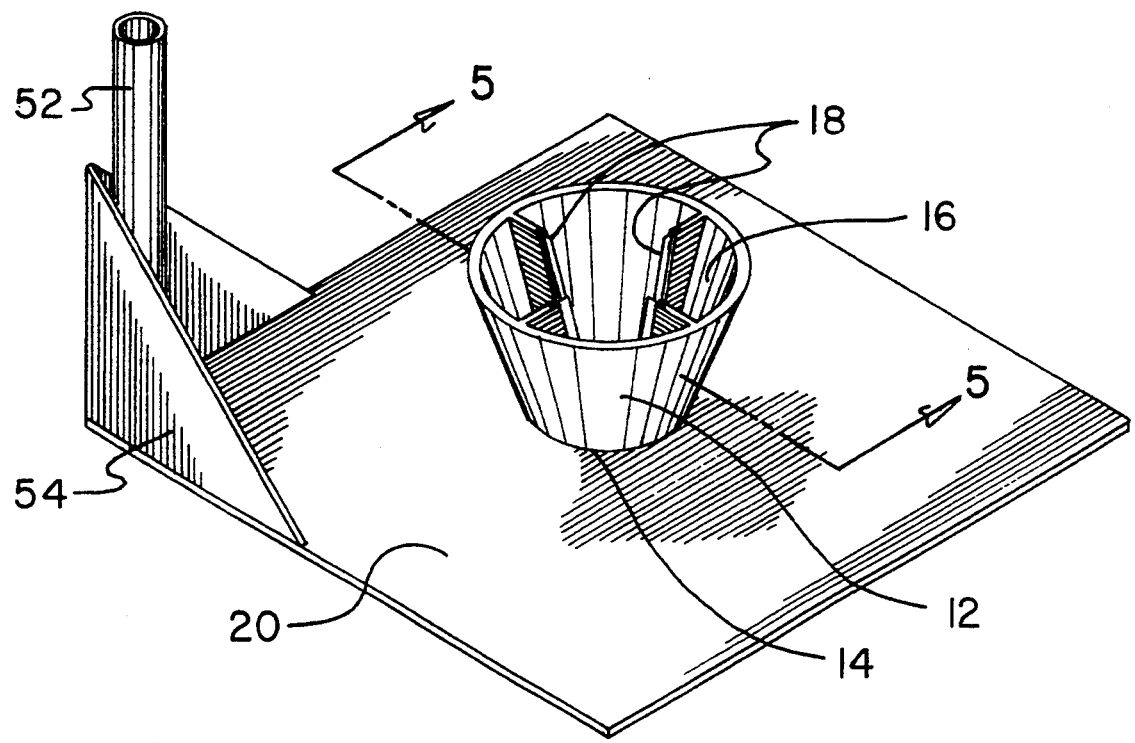
FIG. 4 is a perspective view of the container and base of the Christmas tree stand.
Figure 5:
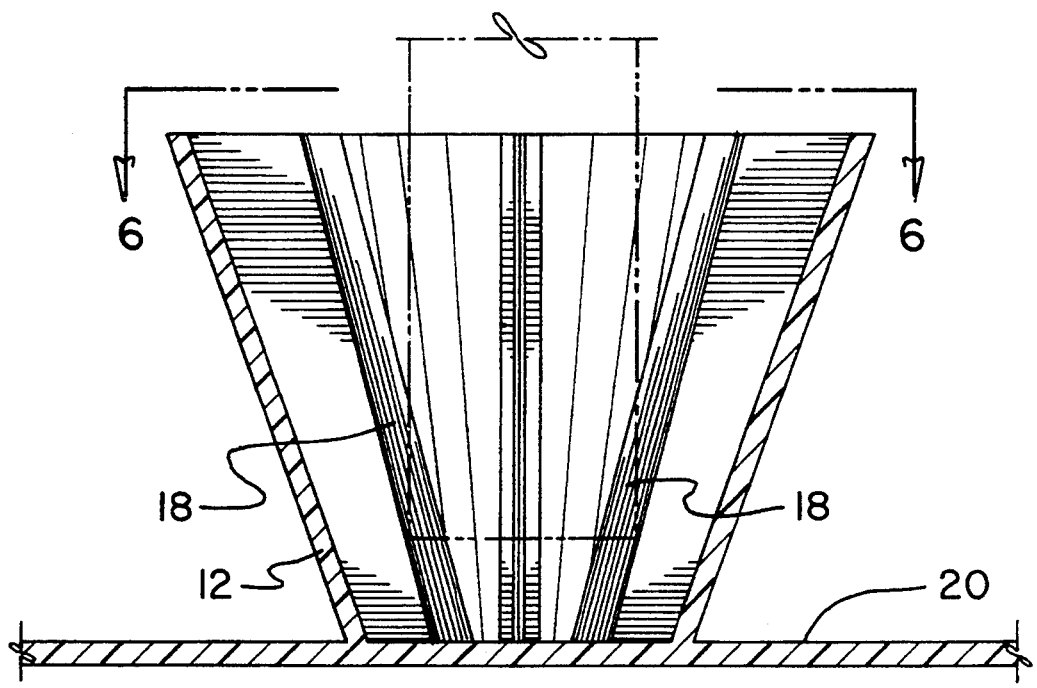
FIG. 5 a side view of the container and base of the Christmas tree stand.
Figure 6:
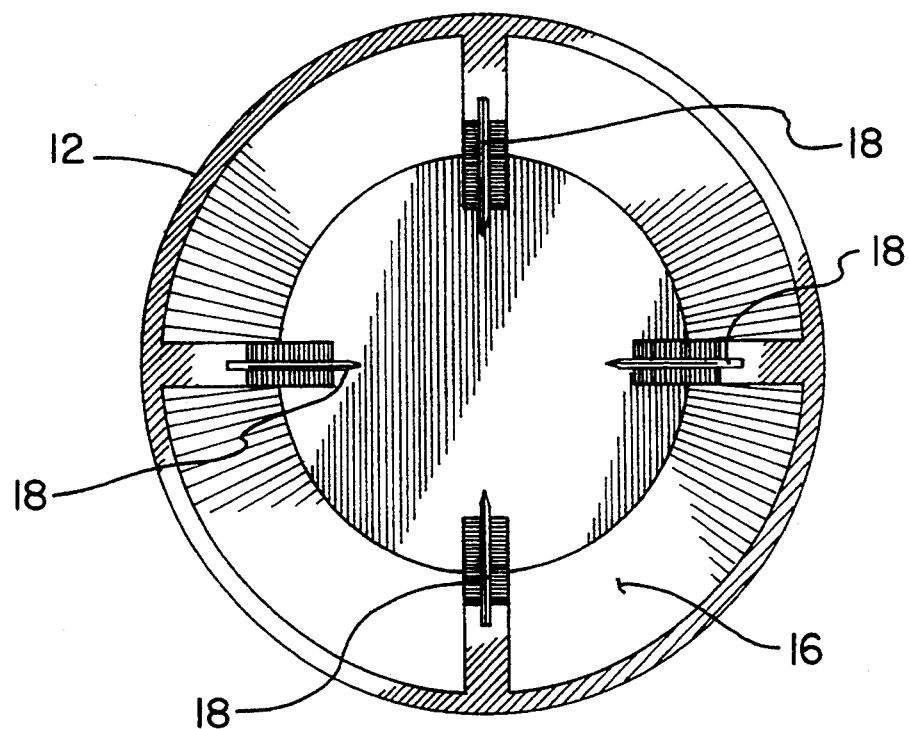
FIG. 6 is a plan view of the container and knives of the Christmas tree stand.

With reference now to the drawings, and in particular, to FIG. 1 thereof, the preferred embodiment of the new and improved Christmas tree stand embodying the principles and concepts of the present invention and generally designated by the reference number 10 will be described.

More specifically, it will be noted in the various figures that the tree stand 10 comprises a container 12 having a bottom end 14 and an opening 16 opposite the bottom end. The container is adapted to receive a butt end of a tree trunk through the opening and hold a reservoir of water. The container further includes a plurality of knife blades 18 disposed therein and coupled thereto. The knife blades are aligned to engage a tree trunk and hold it in an upright position. These knife blades can be removed from the container for replacement when they become worn or damaged.

The bottom end 14 of the container is centrally affixed to a rigid and planar base 20. The base is adapted to stabilize the container when the butt end of a tree trunk is disposed therein. The base can be cut-out in several shapes for decorative purposes, such as a star, snowman, or Santa.

The stand includes a clamp 22. The clamp further includes an elongated support arm 24 having a tip end and a base end. A U-shaped member 26 is coupled to the tip end. The U-shaped member is adapted to hold a tree trunk therein.

The device includes an elongated and rigid first staging rod 28 having a first end and a second end. The first end is coupled to the base end of the clamp 22.

The device includes an elongated and rigid second staging rod 30. The second staging rod further includes a lower end, an upper end, and an intermediate location defined therebetween. The second staging rod also has a lower segment 32 and an upper segment 34. The lower segment extends laterally between the lower end and the intermediate location. The upper segment extends upwardly from the intermediate location to the upper end.

A first collar 36 is coupled to the upper end of the second staging rod 30 with the first staging rod 28 slidably disposed therein. The first collar also has a threaded hole 38 disposed thereon with a screw 40 disposed therein for securing the first staging rod thereto once the lateral extent of the first staging rod relative to the first collar has been adjusted based on the shape and fullness of the tree.

The device includes a second collar 42. The second collar further includes a downwardly extending alignment rod 44 for upwardly and rotatably adjusting the position of the clamp 22. The lower segment 32 of the second staging rod is slidably disposed in the second collar. The second collar also has a threaded hole 46 disposed thereon with a screw 48 disposed therein for securing the second staging rod thereto once the lateral extent of the second staging rod relative to the second collar has been adjusted based on the shape and fullness of the tree.

An elongated and upright support leg 50 further comprising a rigid tubular pole 52 is connected to the base 20. The support leg has a plurality of gussets 54 coupled to the pole and the base for reinforcing the connection therebetween. The pole has a first end and a second end. The first end is connected to the base with the second end extending upwardly therefrom. The second end has the alignment rod 44 of the second collar rotatably disposed therein. The second end of the pole further includes a threaded hole 56 disposed thereon with a screw 58 disposed therein for securing the second collar thereto once the upward extent of the alignment rod and angular displacement of the second staging rod relative to the container has been adjusted based on the height and fullness of the tree. The base 20, support leg 50, second collar 42, second staging rod 30, first collar 36, and first staging rod 28 combine to locate the clamp 22 at a position offset from and aligned with the container where it safely holds a tree trunk upright. Furthermore, since the clamp can be placed in various positions to support a tree, it can also be placed in a position out of view so as not to diminish the tree's beauty.

Figure 7:
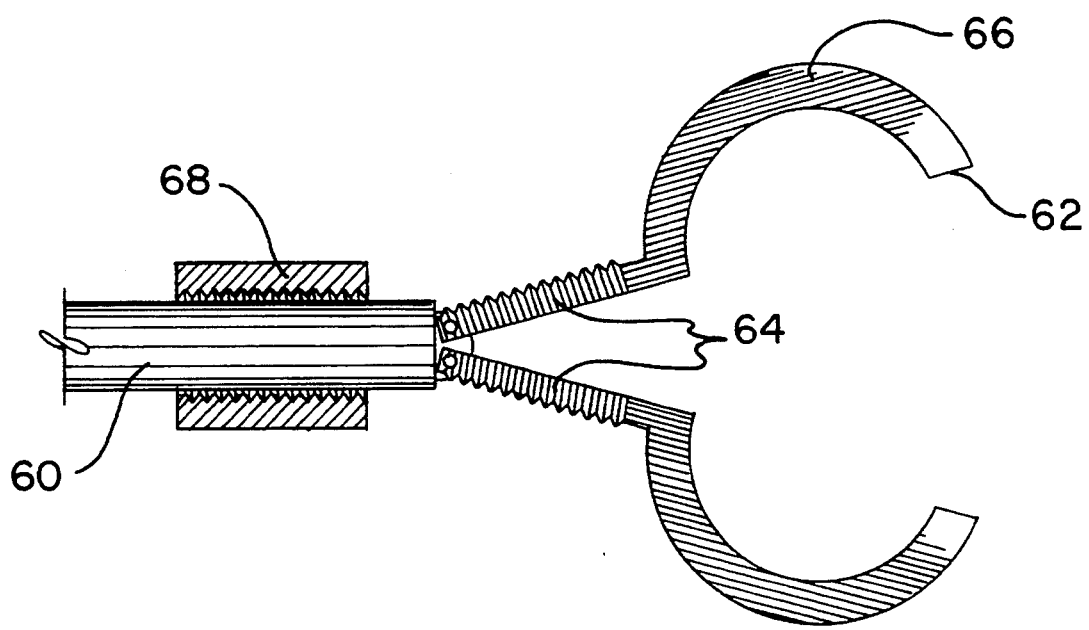
FIG. 7 is a side view of the clamp used in an alternate embodiment of the present invention.

A second embodiment of the clamp of the present invention is shown in FIG. 7. The clamp includes a threaded handle 60. The clamp also includes a pair of oppositely opposed jaws 62. Each jaw further includes a first end, a second end, and an intermediate location defined therebetween. Each first end is pivotally coupled to the handle. Each jaw further includes an elongated and threaded support arm 64 extending between the first end and the intermediate location. Each jaw further includes a curved portion 66 extending between the intermediate location and the second end. A fitting 68 is threadably coupled to the handle. The pair of threaded support arms is adapted to receive the fitting therearound. When a tree trunk is disposed between the curved portions of the jaws and the fitting is moved towards the trunk from the handle 60 to the threaded support arms 64, the jaws close to couple the trunk therebetween.

The safety christmas tree stand of the present invention, as the name suggests, is designed to firmly support a christmas tree without the need to repeatedly adjust its attitude or reposition it when it has been advertently nudged. It is comprised of a base, a bucket and a support pole. The base is one eighth of an inch thick, two feet square and has a one inch high vertical wall around its entire perimeter. The bucket is affixed centrally to the base, and the support pole is mounted just inside the edge of the base at the midpoint of one of its sides. This pole is supported by gussets at its base, stands three feet high and has an adjustable collar at its upper end; an arm, with a looped clamp at its end, extends from the collar.

In use, the tree is placed within the bucket, the collar is adjusted to suit the shape and fullness of the tree and the clamp is engaged around the truck of the tree. The bucket serves as the central mooring point for the tree and is filled with water to keep the tree fresh. Hence, it can be seen that the upper support point for the tree takes full advantage of the leverage principle, and it is virtually impossible to move the tree, much less upset it by accident.

Conventional stands typically have one bottom prong, upon which the tree is impaled, and three side mounted adjusting screws; however, the vertical span between these features is very short, and it is difficult to adjust the attitude of the tree. Further, this short distance compares very unfavorably with the overall height of the tree in terms of support leverage, and the tree can easily be moved. The safety christmas tree stand of the present invention addresses and eliminates these problems.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved tree stand for securing a cut tree in an upright position, the tree stand comprising:
   a container having a bottom end and an opening opposite the bottom end, the container adapted to receive a butt end of a tree trunk through the opening and hold a reservoir of water, the container further having a plurality of knife blades disposed therein and coupled thereto, the knife blades aligned to engage a tree trunk and hold it in an upright position;

a rigid and planar base having the bottom end of the container centrally affixed thereto, the base adapted to stabilize the container when the butt end of a tree trunk is disposed therein;

a clamp further comprising: an elongated support arm having a tip end and a base end and a U-shaped member coupled to the tip end, the U-shaped member adapted to hold a tree trunk therein;

an elongated and rigid first staging rod having a first end a second end, the first end coupled to the base end of the clamp;

an elongated and rigid second staging rod further comprising a lower end and an upper end, and an intermediate location defined therebetween and a lower segment and an upper segment with the lower segment extending laterally between the lower end and the intermediate location and with the upper segment extending upwardly from the intermediate location to the upper end;

a first collar coupled to the upper end of the second staging rod with the first staging rod slidably disposed therein, the first collar further having a threaded hole disposed thereon with a screw disposed therein for securing the first staging rod thereto once the lateral extent of the first staging rod relative to the first collar has been adjusted;

a second collar having a downwardly extending alignment rod coupled thereto and the lower segment of the second staging rod slidably disposed therein, the collar further having a threaded hole disposed thereon with a screw disposed therein for securing the second staging rod thereto once the lateral extent of the second staging rod relative to the second collar has been adjusted; and an elongated and upright support leg further comprising a rigid tubular pole connected to the base and a plurality of gussets coupled to the pole and the base for reinforcing the connection therebetween, the pole having a first end and a second end, the first end connected to the base with the second end extending upwardly therefrom, the second end having the alignment rod of the second collar rotatably disposed therein, the second end of the pole further having a threaded hole disposed thereon with a screw disposed therein for securing the second collar thereto once upward extent of the alignment rod and the angular displacement of the second staging rod relative to the container has been adjusted, whereby the base, support leg, second collar, second staging rod, first collar, and first staging rod combine to locate the clamp at a position offset from and aligned with the container where it holds a tree trunk upright.

2. A new and improved tree stand for securing a cut tree in an upright position, the tree stand comprising:

a container adapted to receive the butt of a tree trunk and hold in an upright position;

a clamp adapted to hold a tree trunk, the clamp including a threaded handle;

a pair of oppositely opposed jaws, each jaw further comprising a first end and a second end and an intermediate location defined therebetween with the first end pivotally coupled to the handle;

a pair of elongated and threaded support arms, each arm extending between a first end and an intermediate location with the pair of support arms adapted to receive a threaded fitting therearound;

a curved portion extending between the intermediate location and the second end;

a fitting threadably coupled to the handle, whereby when a tree trunk is disposed between the curved portions of the jaws and the fitting is moved towards the tree trunk from the handle to the pair of threaded support arms, the jaws close to couple the trunk therebetween; and means for locating the clamp at a position offset from and aligned with the container where it holds a tree trunk upright.

* * * * *